United States Patent [19]

Bartholomew

[11] 4,417,813
[45] Nov. 29, 1983

[54] NON-SCANNED HETERODYNE IMAGING SENSOR

[75] Inventor: Bruce J. Bartholomew, Poway, Calif.

[73] Assignee: General Dynamics Corporation/Convair Div., San Diego, Calif.

[21] Appl. No.: 301,265

[22] Filed: Sep. 11, 1981

[51] Int. Cl.³ .............................................. G02B 9/02
[52] U.S. Cl. .................................... 356/349; 372/23
[58] Field of Search ................... 356/349; 372/19, 20, 372/23; 350/3.67, 3.68; 365/215, 234; 455/619

[56] References Cited

U.S. PATENT DOCUMENTS

| Re. 30,166 | 12/1979 | Lee | 250/550 X |
|---|---|---|---|
| 3,403,348 | 9/1968 | Ashkin et al. | 372/19 X |
| 3,753,151 | 8/1973 | Schulten | 372/19 X |
| 3,868,658 | 2/1975 | Kiemle | 350/3.75 X |
| 4,263,002 | 4/1981 | Sathyakumar | 356/349 |
| 4,305,666 | 12/1981 | Becherer et al. | 356/349 |

*Primary Examiner*—Vincent P. McGraw
*Assistant Examiner*—Matthew W. Koren
*Attorney, Agent, or Firm*—John R. Duncan; Frank D. Gilliam

[57] ABSTRACT

A non-scanning heterodyne optical imaging sensor which utilizes a multi-frequency coherent light source to provide a plurality of points of different frequencies on a single detector on which the image of an object is also projected. Each point acts as a local oscillator which is sensed/filtered to construct the image of the object without mechanical scanning.

4 Claims, 2 Drawing Figures

NON-SCANNED HETERODYNE IMAGING SENSOR

BACKGROUND OF THE INVENTION

This invention relates to optical image sensing devices and is specifically directed to a new and improved heterodyne imaging sensor utilizing a frequency coding technique.

The use of heterodyne techniques in optical information reading is old in the art as shown by way of example in the U.S. Pat. No. 3,868,658 to Kiemle which utilized an optical memory information bearing light beam and a frequency shifted light beam merged together to scan a detector column by column and row by row.

In another U.S. Pat. No. Re. 30,166 to Lee, a heterodyne technique was utilized to increase the signal-to-noise ratio during the read-out stage which utilized an array of detectors to receive superimposed beams at the reconstructed image plane.

Both the above patented systems are of the scanning type utilizing arrays of detectors and mechanical scanning devices.

This invention is a heterodyne imaging sensor without an array of detectors and without mechanical scanning which utilizes a frequency coding technique.

SUMMARY OF THE INVENTION

In a system constructed in accordance with the teachings of this invention, an object is illuminated by a coherent light source and an image of the object is formed on a single photodetector. Superimposed on the reflected image is the image of an array of points, each with a different frequency. Each point in the array serves as a local oscillator for this corresponding point in the image of the object. The current in the photodetector will have numerous frequency components and each component will correspond to a single image point. The electrical system selectively filters out each component and constructs an image of the object.

DETAILED DESCRIPTION

Figure 1:
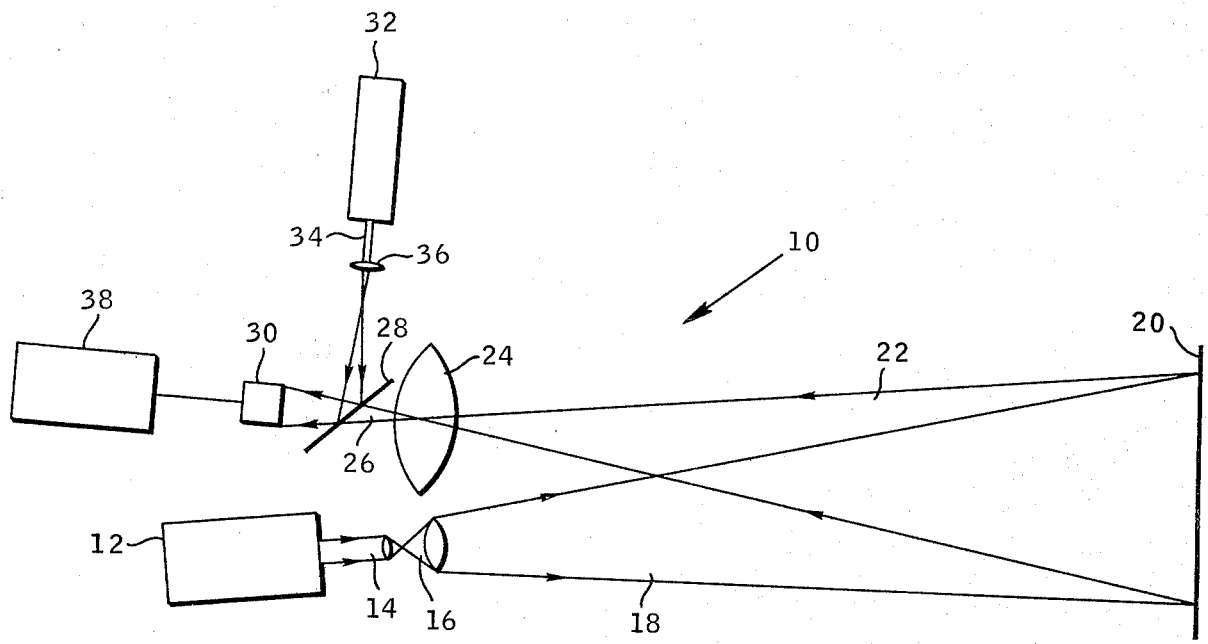
FIG. 1 is a schematic illustration of a non-scanning type heterodyne imaging sensor system constructed in accordance with the teachings of this invention.

The non-scanning heterodyne imaging sensor is illustrated in FIG. 1 at 10 and seen to comprise a coherent light source (laser) 12 which directs its beam 14 to a first optical system 16, the output of which is a diverging beam 18 illuminating a target or object 20 to be observed. The reflected image beam 22 is directed to a lens system 24 which directs its output beam 26 through a beam splitter 28 onto a large area photodetector 30. A multi-frequency light source 32 directs its output beam 34 through an imaging lens system 36 onto the beam splitter 28 where the beam 34 combines with the reflected image beam 22 and both are directed toward the detector 30. The multifrequency beam 34 originates from a number of different points in the source 32, each point corresponding to a single frequency. The lens system 36 images this array of points onto the detector 30. Thus, superimposed on the image of the object is the image of an array of points, each of which has a different frequency. Each point in the array serves as a local oscillator for the corresponding point in the image of the object. The current generated in the photodetector 30 will have numerous frequency components and each component will correspond to a single image point. Thus, with a processing electronic system 38 connected to the detector 39 each component is selectively filtered out and the image of the object is constructed.

Figure 2:
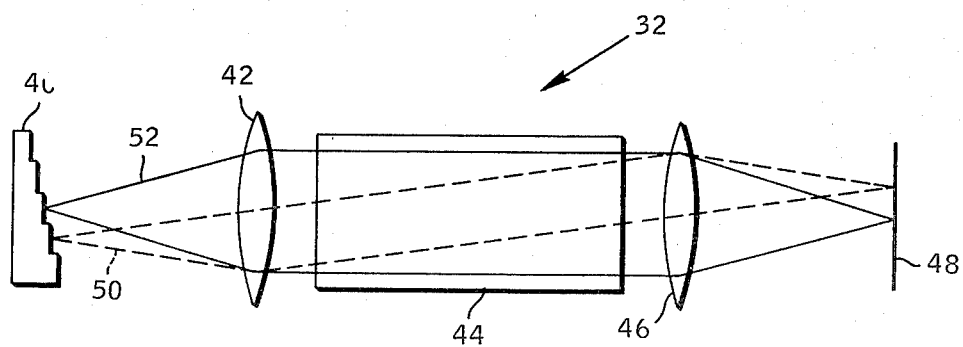
FIG. 2 is a schematic illustration of a multi-frequency source for the non-scanned heterodyne imaging sensor system of FIG. 1.

Turning now to FIG. 2, where one possible multifrequency source 32 is shown in detail, it can be seen to comprise a stepped mirror 40 with its steps exaggerated in the drawing for clarity in the focal plane of a lens 42, a laser gain medium 44 with a large gain bandwidth, a second lens 46 and a plane mirror 48 which is partially transmitting and located in the focal plane of the second lens. Also illustrated in the figure are two possible lasing modes 50 and 52. The steps in mirror 40 have been selected so that the modes 50 and 52 have a predetermined frequency difference. All of the modes determined by the steps in the mirror 40 are focused to points on the partially transmitting mirror 48 where a fraction of each mode is transmitted toward the beam splitter 28. This array of points, each at a different frequency, is imaged by the lens 36 onto the detector 30.

The filtering system 38, as will be apparent to those skilled in the art, may consist of a set of standard fixed frequency bandpass filters, a Fourier transform processor, or any other acceptable system such as a Hewlett-Packard Spectrum Analyzer Model 8568A. The only point to consider is that each image point appears at a separate frequency in the detector output and hence the whole image can be reconstructed by looking at the amplitude of each frequency component.

What is claimed is:

1. A non-scanning heterodyne imaging sensor comprising
   a first source of coherent light,
   means directing a beam from said first source of coherent light for illuminating an object,
   a photodetector,
   means directing a beam of the reflection of said object onto said photodetector,
   a second multi-frequency coherent light source,
   means directing light from said multi-frequency light source onto said photodetector concurrently with the reflected beam of said object for providing a plurality of points on said photodetector each with a different frequency,
   means for sensing each of said points on said photodetector to provide an image of said object.

2. The sensor as claimed in claim 1 wherein said means for directing said coherent light toward said object comprises a first lens system and wherein the means for directing said reflected light from said object comprises a second lens system.

3. The sensor as claimed in claim 2 wherein a beam splitter is located in the beam of reflected light from said object and wherein the second multi-frequency coherent light source is directed to said beam splitter so that the reflected light and the multi-frequency light are merged to provide a beat frequency for each of the points on said photodetector.

4. The sensor as claimed in claim 3 wherein said means for providing the image comprises a filtering system responsive to each of the points of different frequencies on said photodetector.

* * * * *